US008656298B2

(12) United States Patent
Rose et al.

(10) Patent No.: US 8,656,298 B2
(45) Date of Patent: Feb. 18, 2014

(54) SYSTEM AND METHOD FOR CONDUCTING ONLINE CAMPAIGNS (75) Inventors: Robert Rose, San Diego, CA (US); Owen Adams, Scottsdale, AZ (US); Brian Derfer, San Diego, CA (US); Nichole Goodyear, San Diego, CA (US); Kelvin Hung, San Diego, CA (US); Camille Matthews, Silverdale, WA (US); Kevin Rollins, Denton, TX (US); Tom Underwood, San Diego, CA (US); Jeremy Wiles, San Diego, CA (US)

(73) Assignee: Social Mecca, Inc., Franklin Park, IL (US)

( * ) Notice: Subject to any disclaimer, the term of this patent is extended or adjusted under 35 U.S.C. 154(b) by 835 days.

(21) Appl. No.: 12/326,011

(22) Filed: Dec. 1, 2008

(65) Prior Publication Data

US 2009/0271730 A1 Oct. 29, 2009

Related U.S. Application Data (60) Provisional application No. 60/991,670, filed on Nov. 30, 2007, provisional application No. 61/078,243, filed on Jul. 3, 2008.

(51) Int. Cl.
*G06F 3/048* (2013.01)
(52) U.S. Cl.
USPC ............................................ 715/772; 709/224
(58) Field of Classification Search
USPC .......... 715/736, 738, 745, 772; 709/209, 217, 709/219, 224
See application file for complete search history.

(56) References Cited

U.S. PATENT DOCUMENTS 6,233,618 B1 * 5/2001 Shannon ....................... 709/229
6,578,008 B1 6/2003 Chacker
(Continued)

FOREIGN PATENT DOCUMENTS

WO 2009/006551 A3 12/2009

OTHER PUBLICATIONS

Beaumont, "Napoleon Dynamite Dance Off Challenge!", http://blogcritics.org/archives/2006/05/04/032537.php, printed from the World Wide Web on Mar. 5, 2008, 3 pages.

(Continued)

*Primary Examiner* — Omar Abdul-Ali
*Assistant Examiner* — Anil Bhargava
(74) *Attorney, Agent, or Firm* — Barnes & Thornburg LLP (57) ABSTRACT Systems and methods for generating displays showing interactions with a piece of content accessible via a number of unrelated websites are described. One embodiment of the invention includes storing a piece of content within a database and providing access to the piece of content via a website hosted by a server associated with the database, receiving a request from a user to propagate the piece of content to a $3^{rd}$ party website hosted via a $3^{rd}$ party server, obtaining user account information, accessing the $3^{rd}$ party server using the user account information, providing propagation player code to the $3^{rd}$ party server, where the propagation player code includes information enabling a browser application to access the piece of content via the server associated with the database, receiving requests from browser applications, where the requests are associated with user interactions with the piece of content, identifying requests associated with a user interaction via the propagation player included in the $3^{rd}$ party website, updating database records tracking user interactions with the piece of content via different websites in response to the received requests, and generating a display of the websites to which the content has been propagated, where the display includes the $3^{rd}$ party website.

21 Claims, 4 Drawing Sheets

(56) References Cited

U.S. PATENT DOCUMENTS

| | | | |
|---|---|---|---|
| 6,631,404 B1 | 10/2003 | Philyaw | |
| 6,739,508 B2 | 5/2004 | Ushioda et al. | |
| 6,874,024 B2* | 3/2005 | Cohen et al. | 709/224 |
| 7,020,635 B2* | 3/2006 | Hamilton et al. | 705/51 |
| 7,020,781 B1* | 3/2006 | Saw et al. | 705/51 |
| 7,035,926 B1* | 4/2006 | Cohen et al. | 709/225 |
| 7,162,433 B1* | 1/2007 | Foroutan | 705/7.42 |
| 7,353,239 B2 | 4/2008 | Allard | |
| 7,526,545 B2* | 4/2009 | Jerome | 709/224 |
| 7,574,364 B2 | 8/2009 | Hasegawa et al. | |
| 7,640,181 B2 | 12/2009 | McClure et al. | |
| 7,703,611 B1 | 4/2010 | Appelman et al. | |
| 7,783,622 B1 | 8/2010 | Vandermolen et al. | |
| 2002/0120501 A1* | 8/2002 | Bell et al. | 705/14 |
| 2002/0198933 A1 | 12/2002 | Kwak | |
| 2003/0171990 A1 | 9/2003 | Rao et al. | |
| 2004/0015401 A1* | 1/2004 | Lee et al. | 705/16 |
| 2004/0024643 A1* | 2/2004 | Pollock et al. | 705/16 |
| 2004/0034559 A1 | 2/2004 | Harris et al. | |
| 2004/0244029 A1 | 12/2004 | Gross | |
| 2005/0044413 A1 | 2/2005 | Elms et al. | |
| 2005/0071218 A1 | 3/2005 | Lin et al. | |
| 2006/0074751 A1* | 4/2006 | Kline et al. | 705/14 |
| 2006/0282283 A1 | 12/2006 | Monahan | |
| 2006/0282336 A1 | 12/2006 | Huang | |
| 2007/0033105 A1 | 2/2007 | Collins et al. | |
| 2007/0067297 A1 | 3/2007 | Kublickis | |
| 2007/0094076 A1 | 4/2007 | Perkowski et al. | |
| 2007/0106551 A1 | 5/2007 | McGucken | |
| 2007/0143750 A1 | 6/2007 | Varela et al. | |
| 2007/0162761 A1 | 7/2007 | Davis et al. | |
| 2007/0180468 A1 | 8/2007 | Gill et al. | |
| 2007/0192863 A1* | 8/2007 | Kapoor et al. | 726/23 |
| 2007/0244634 A1 | 10/2007 | Koch et al. | |
| 2008/0082381 A1 | 4/2008 | Muller et al. | |
| 2008/0091555 A1 | 4/2008 | Heather et al. | |
| 2008/0133488 A1 | 6/2008 | Bandaru et al. | |
| 2008/0140786 A1 | 6/2008 | Tran | |
| 2008/0167947 A1 | 7/2008 | Skinner et al. | |
| 2008/0172288 A1 | 7/2008 | Pilskalns et al. | |
| 2008/0244038 A1* | 10/2008 | Martinez | 709/218 |
| 2008/0256233 A1* | 10/2008 | Hall et al. | 709/224 |
| 2008/0262908 A1 | 10/2008 | Broady et al. | |
| 2008/0320075 A1* | 12/2008 | Livshits et al. | 709/203 |
| 2009/0043654 A1 | 2/2009 | Bates | |
| 2009/0064005 A1* | 3/2009 | Cunningham et al. | 715/764 |
| 2009/0125391 A1 | 5/2009 | Toutonghi | |
| 2009/0164271 A1* | 6/2009 | Johnson et al. | 705/7 |
| 2010/0042499 A1* | 2/2010 | Barton | 705/14.53 |
| 2010/0094713 A1 | 4/2010 | Wax | |

OTHER PUBLICATIONS

Cramphorn et al., "Global Advertising that Sells—Progressing Towards the Holy Grail!", Part 5 / Can Advertising Travel?, Congress 2005, ESOMAR 2005, 10 pages.

International Search Report for International Application No. PCT/US2008/069097, International Filing Date Jul. 2, 2008, Report completed Sep. 26, 2008, mailed Oct. 8, 2008, 2 pgs.

International Search Report for International Application No. PCT/US2008/069223, Report completed Aug. 27, 2008, mailed Sep. 3, 2008, 3 pgs.

International Search Report for International Application No. PCT/US2008/069264, filed Jul. 3, 2008, Report completed Oct. 10, 2008, 3 pgs.

International Search Report for International Application PCT/US2008/069093, Report completed Aug. 23, 2008, mailed Sep. 3, 2008, 3 pgs.

Kirkpatrick, Techcrunch.com, "Bix Posts", http://www.techcrunch.com/tag/bix/, printed from the World Wide Web on Mar. 5, 2008, 4 pages.

Moe's Southwest Grill, "Moe's Southwest Grill Video Contest—Official Rules", http://www.moes.sharkle.com/rules.html, printed from the World Wide Web on Mar. 5, 2008, 2 pages.

Moe's Southwest Grill, http://www.moes.sharkle.com/index.html, printed from the World Wide Web on Mar. 5, 2008, 1 page.

PR Newswire Association LLC, "Do You Have the Hottest Dad in America?", http://www.prnewswire.com/cgi-bin/stories.pl?ACCT=104&STORY=/www/story/04-24-20 . . . , printed from the World Wide Web on Mar. 5, 2008, 2 pages.

Rollmio.com, "What is rollmio", http://rollmio.com/nodes/view/whats, dated Aug. 8, 2007, printed from the World Wide Web on Apr. 23, 2008, 3 pages.

Shycast.com, "Rules Summary", http://www.shycast.com/rules/ikea, printed from the World Wide Web on Mar. 5, 2008, 3 pages.

Tapatap.com, http://www.tapatap.com/tapatap-userweb2/contests_index.htm?offset=1360&bpld=3&bdld . . . , printed from the World Wide Web on Mar. 5, 2008, 4 pages.

The ARF, "Engagement: Definitions and Anatomy", dated Mar. 21, 2006, 21 pages.

ViTrue, Inc., "Moe's Southwest Grill Partners with ViTrue, Inc. to Launch User-Created Advertising Campaign", dated Jun. 20, 2006, 3 pages.

VMIX, "Enter the JVC "Create Our Commercial" Online Video Contest for free at VMIX.com!", http://www.vmix.com/jvc.php, printed from the World Wide Web on Mar. 5, 2008, 1 page.

VMIX.com, "VMIX Past Online Contests and Sweepstakes", http://www.vmix.com/contests-past.php, printed from the World Wide Web on Mar. 5, 2008, 2 pages.

Votigo.com, http://web.archive.org/web/20070202023933/http://votigo.com/, retrieved from Archive.org, printed from the World Wide Web on Mar. 5, 2008, 1 page.

Votigo.com, http://web.archive.org/web/20070206165655/http://votigo.com/, retrieved from Archive.org, printed from the World Wide Web on Mar. 5, 2008, 2 pages.

Written Opinion for International Application No. PCT/US2008/069097, filed Jul. 2, 2008, Opinion completed Sep. 26, 2008, mailed Oct. 8, 2008, 4 pgs.

Written Opinion for International Application No. PCT/US2008/069223, Opinion completed Aug. 28, 2008, mailed Sep. 3, 2008, 5 pgs.

Written Opinion for International Application No. PCT/US2008/069264, filed Jul. 3, 2008, completed Oct. 24, 2008, mailed Nov. 3, 2008, 4 pgs.

Written Opinion for International Application PCT/US2008/069093, Opinion completed Aug. 23, 2008, mailed Sep. 3, 2008, 6 pgs.

Zooppa.com, http://www.zooppa.com/corporate/press_releases/zooppa-com-advertising-goes-social, printed from the World Wide Web on Mar. 5, 2008, 3 pages.

Arrington et al., "Shycast: Social Network for People & Brands—Post and Comments", http://www.techcrunch.com/2007/01/17/shycast-social-network-for-people-brands/, printed from the World Wide Web on Mar. 5, 2008, 10 pages.

Kjeldsen et al., "Bix sees green in online contests—Post and Comments", dated Jul. 17, 2006, http://www.techcrunch.com/2006/07/17/bix-sees-green-in-online-contests/, printed from the World Wide Web on Mar. 5, 2008, 9 pages.

* cited by examiner

SYSTEM AND METHOD FOR CONDUCTING ONLINE CAMPAIGNS

CROSS-REFERENCE TO RELATED APPLICATIONS

This application claims priority to U.S. Provisional Application Ser. No. 60/991,670 filed Nov. 30, 2007 entitled "System and Method for Conducting Online Campaigns" and U.S. Provisional Application Ser. No. 61/078,243 filed Jul. 3, 2008 entitled "Internet Based Multilingual Advertising Methods and Systems and Geographical Location Mapping Systems and Methods", the disclosure of which is expressly incorporated by reference herein in its entirety.

BACKGROUND

The present invention relates generally to tracking interactions with content and more specifically to tracking interactions with online marketing campaigns involving solicitations for User Generated Content (UGC).

The ability to track visitors to and interactions with a website can provide valuable information for improving the content and/or function of the website and for selling advertising opportunities associated with the website to advertisers. Systems for conducting online marketing campaigns and tracking engagement with the campaign are described in U.S. patent application Ser. No. 11/893,765 entitled "Online Marketing Platform" filed Aug. 17, 2007, the disclosure of which is incorporated by reference herein in its entirety.

SUMMARY OF THE INVENTION

Systems and methods for generating displays showing interactions with a piece of content accessible via a number of unrelated websites are described. One embodiment of the invention includes storing a piece of content within a database and providing access to the piece of content via a website hosted by a server associated with the database, receiving a request from a user to propagate the piece of content to a $3^{rd}$ party website hosted via a $3^{rd}$ party server, obtaining user account information, accessing the $3^{rd}$ party server using the user account information, providing propagation player code to the $3^{rd}$ party server, where the propagation player code includes information enabling a browser application to access the piece of content via the server associated with the database, receiving requests from browser applications, where the requests are associated with user interactions with the piece of content, identifying requests associated with a user interaction via the propagation player included in the $3^{rd}$ party website, updating database records tracking user interactions with the piece of content via different websites in response to the received requests, and generating a display of the websites to which the content has been propagated, where the display includes the $3^{rd}$ party website.

In a further embodiment, the website hosted by the server associated with the database includes a user interface, which enables a user to request that the piece of content be propagated to a $3^{rd}$ party website hosted via a $3^{rd}$ party server.

In another embodiment, the server associated with the database uses identifying information included in requests received from propagation players to identify the $3^{rd}$ party website through which a user is interacting with the piece of content.

In a still further embodiment, the propagation player code includes a unique URL for each piece of content, the propagation player requests information from the server, where the request includes the URL and information identifying the URL of the website containing the propagation player, and the server associated with the database uses the URL of the website when update database records tracking user interactions with the piece of content via different websites in response to the received requests.

In still another embodiment, the propagation player includes a user interface, which enables a user to request that the piece of content be propagated to a $3^{rd}$ party website hosted via a $3^{rd}$ party server, and the server associated with the database tracks the website from which a request to propagate the piece of content originated and the $3^{rd}$ party website to which the piece of content is propagated.

In a yet further embodiment, the display is a graph, where the vertices of the graph represent websites and the edges of the graph represent propagation of the piece of content.

In yet another embodiment, each vertex is represented by a circle and the radius of the circle is proportional to the number of interactions with the piece of content via the website represented by the vertex.

In a further embodiment again, multiple propagations originating from a first website to a second website are represented by a single line annotated with a number indicating the number of propagations.

In another embodiment again, the vertex corresponding to the website hosted by the server associated with the database is located at the center of the graph and edges corresponding to propagations from the website radiate outward.

In a further additional embodiment, each vertex is annotated with at least one annotation indicative of the number of a particular type of interaction that occurred with a piece of content via the website corresponding to the vertex.

In another additional embodiment, the particular type of interaction is viewing, scrolling over, accessing, voting, reviewing, or playing the content.

In a still yet further embodiment, at least one annotation is indicative of a score that is calculated using a function of the number of multiple different types of interaction.

Still yet another embodiment includes storing a piece of content within a database and providing access to the piece of content via a website hosted by a server associated with the database, receiving requests from browser applications, where the requests are associated with user interactions with the piece of content, identifying the geographic location from which the requests originated, updating database records tracking user interactions with the piece of content based upon geographic location in response to the received requests, and generating a map showing the geographic locations in which interactions with the content have occurred.

A still further embodiment again also includes receiving a request from a user to propagate the piece of content to a $3^{rd}$ party website hosted via a $3^{rd}$ party server, obtaining user account information, accessing the $3^{rd}$ party server using the user account information, providing propagation player code to the $3^{rd}$ party server, where the propagation player code includes information enabling a browser application to access the piece of content via the server associated with the database, and identifying requests associated with a user interaction via the propagation player included in the $3^{rd}$ party website.

In still another embodiment again, the map indicates the website via which the user interactions occurred.

In a still further additional embodiment, interactions are indicated on the map as a single aggregated pinpoint.

In still another additional embodiment, different types of interactions are indicated on the map using different identifiers.

In a yet further embodiment again, identifying the geographic location from which the requests originated includes mapping an I.P. address associated with the request to a geographic location.

In yet another embodiment again, identifying the geographic location from which the requests originated further includes maintaining user accounts including address information, receiving log in information from users accessing the content, and identifying a request from a user logged into a user account and assigning the address information in the user account as the geographic location from which the request originated.

A yet further additional embodiment includes storing multiple pieces of content within a database and providing access to the pieces of content via a website hosted by a server associated with the database, receiving requests from users to propagate the content to $3^{rd}$ party websites hosted via $3^{rd}$ party servers, obtaining user account information, accessing the $3^{rd}$ party servers using user account information, providing propagation player code to the $3^{rd}$ party servers, where the propagation player code includes information enabling a browser application to access a piece of content via the server associated with the database, receiving requests from browser applications, where the requests are associated with user interactions with one of the pieces of content, identifying requests associated with a user interaction via a propagation player included in a $3^{rd}$ party website, updating database records tracking user interactions with each of the pieces of content via different websites in response to the received requests, and generating a display of the websites to which pieces of content have been propagated.

In another further embodiment, the display also includes information concerning interactions with content that occurred via each website.

In still yet another further embodiment, generating a display of the websites to which pieces of content have been propagated includes selecting pieces of content according to a filtering criteria, identifying websites to which the selected pieces of content have been propagated, and generating a display of the websites to which the selected pieces of content have been propagated.

DETAILED DESCRIPTION OF THE INVENTION

Turning now to the drawings, systems for tracking interactions with content accessible via multiple pages within a website or via multiple websites in accordance with embodiments of the invention are disclosed. In many embodiments content accessible via one website can be propagated to other locations within the website (e.g. to other profile pages within a social media network or content distribution network) or to other websites using a player or widget that can be embedded into a site. Players and widgets are typically thought of as portable chunks of code that can be installed and executed within any separate HTML-based web page without requiring additional compilation. Players and widgets offer the advantage of code reuse and provide access to a single piece of content from multiple locations. In several embodiments, a player used to propagate content includes the capability of propagating the content to yet another location. So called "secondary propagations" can be, but are not limited to, propagations to other pages within a website or propagations to other websites. These "secondary propagations" can also be tracked and, in a number of embodiments, all propagations can be graphically represented to provide information concerning the websites from which a particular piece of content can be accessed. In several embodiments, interactions with content at each of the propagated locations are tracked and the tracked interactions can also be graphically displayed. In a number of embodiments, the geographic location of users interacting with content is determined and the geographic locations of users interacting with a piece of content are graphically displayed.

In many embodiments, interactions with online marketing campaigns involving solicitations for the submission of User Generated Content (UGC) are tracked. In several embodiments, propagations of UGC submissions in a campaign are graphically represented. In a number of embodiments, propagation of UGC submissions across multiple campaigns can be graphically represented.

Tracking Website Interactions

Interactions with websites typically involve communication between a user's browser application and one or more servers that host the website. These communications can be used to track interactions with the website and with content associated with the website. In the example of online marketing platforms, such as the online marketing platforms described in U.S. patent application Ser. No. 11/893,765, many forms of engagement including views, scroll overs, accesses, voting, reviews, plays and viral distribution are tracked. The tracked information can be stored in a database maintained by the website and retrieved for analysis.

Propagation of Content Associated with a Website

A number of websites include a database of content that can be accessed via a website hosted on a server associated with the database or via a $3^{rd}$ party website to which the content has been propagated. Propagation of content typically involves copying propagation player code into a page of a website. The code is reusable code that can be configured to enable interaction with a specific piece of content stored within the database. When the propagation player code is received by a browser application from a $3^{rd}$ party website, the browser application can use the propagation player code to retrieve a specific piece of content from the database. In a number of embodiments, the propagation player code is loaded by a unique URL for each piece of content. The player then requests more information from the servers, including things such as the title of the content and the content delivery network (CDN) URL for any media. In several embodiments, the server associated with the database determines in real time whether to provide this information or not based on the moderation status of the content (i.e. whether the content has been suspended for any reason). Use of propagation player code enables a single piece of content to be accessed via multiple locations without the necessity of replicating the content in each propagated location.

The propagation player code or a URL enabling retrieval of the code can be manually inserted into the $3^{rd}$ party website or automatically propagated into the $3^{rd}$ party website using an Application Programming Interface (API). Automatic propagation typically involves the provision of information by a user identifying the $3^{rd}$ party website, and account information with respect to an account maintained on the $3^{rd}$ party website. A server associated with the database containing the content can then use the information provided by the user to insert the propagation player code into a page associated with the user and maintained by the $3^{rd}$ party website. When content is automatically propagated, the server can record the propagation in the database at the time of propagation. When content is manually propagated, the server associated with the database is unaware of the initial propagation. However, the manual propagation is detected on the first occasion in which the content is accessed via a $3^{rd}$ party website in which the propagation player has been manually propagated.

Interactions with content via a propagation player can be tracked by a server associated with the database in which the content is stored. The server associated with the database uses the information from a URL and a "referrer" identified in the HTTP request to identify the content being viewed and the URL of the web page containing the player, which requested the content. The referrer information usually tells the server the exact URL where the player is posted even if the exact same propagation code has been manually propagated to multiple places. In this way, specific interactions can be associated with the specific websites and propagation players that enabled the interactions.

Propagation player code and the retrieval of content in the context of an online marketing platform are discussed in U.S. patent application Ser. No. 11/893,765. In an online marketing platform, propagation spreads entries in a campaign, and thus information about the campaign generally, to sites other than the online marketing platform, enabling a wider potential audience to engage with the campaign.

Secondary Propagation

Propagation players in accordance with many embodiments of the invention enable visitors to a $3^{rd}$ party website in which content has been propagated, potentially multiple times, to engage with the content without leaving the $3^{rd}$ party website. In a number of embodiments, the player also supports the propagation of the content to another location within a $3^{rd}$ party website or to a further website and these secondary propagations can be tracked.

Figure 1:
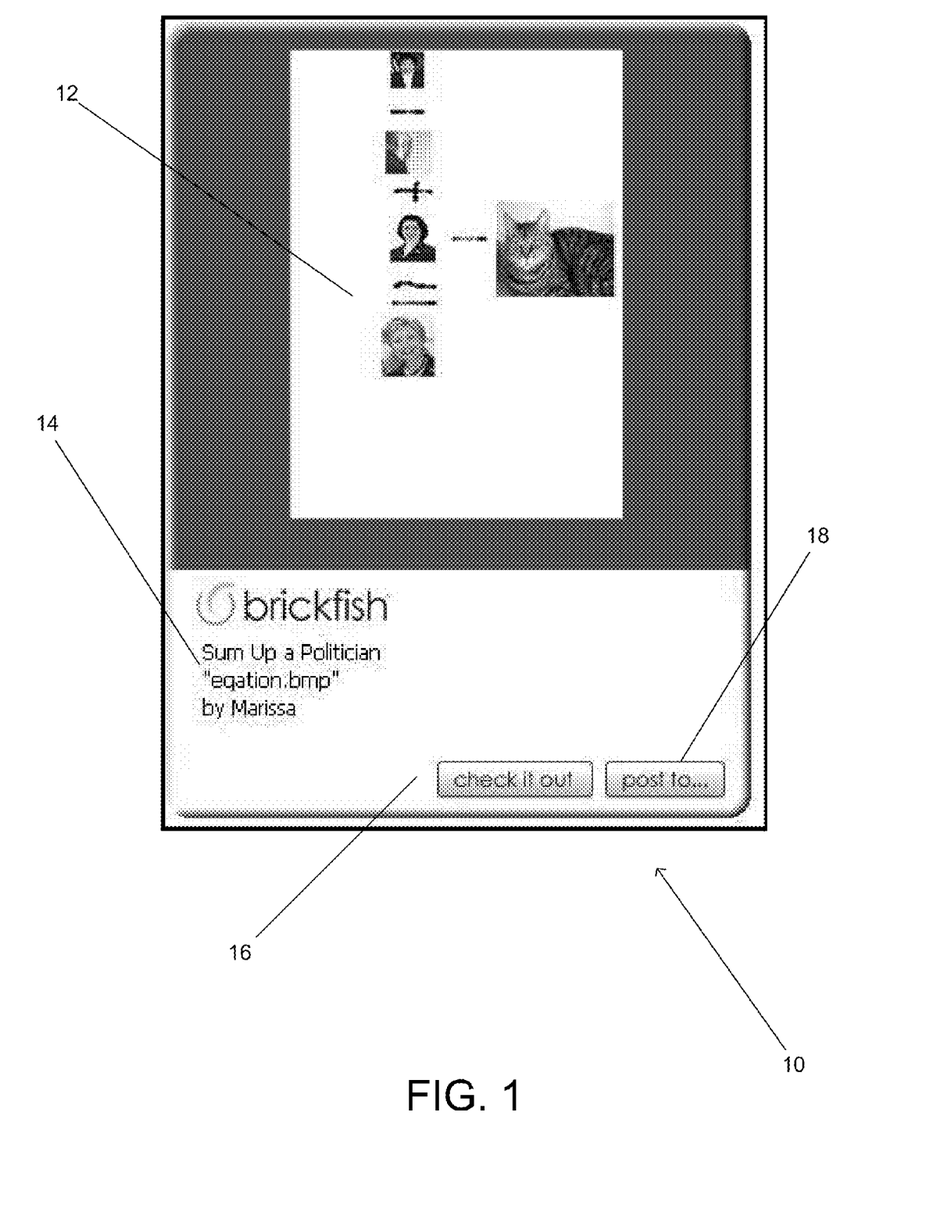
FIG. 1 is a screen shot of a propagation player that provides the option of further propagating a displayed UGC submission to another location in accordance with an embodiment of the invention.

A screen shot of a user interface for a propagation player that forms part of an online marketing campaign in accordance with an embodiment of the invention is shown in FIG. 1. The user interface of the propagation player 10 includes an image 12 of a UGC submission, text 14 describing the UGC submission and mechanisms enabling a user to engage with the UGC submission. In the illustrated embodiment, the user interface of the propagation player includes two buttons. The first button 16 enables a user to navigate to an online marketing platform to view and more extensively engage with the UGC submission. The second button 18 enables a user to propagate the UGC submission to another location, such as another website. When a user provides an instruction to propagate the content, which in the illustrated embodiment is a UGC submission, to a third party website, the instruction is received by a server associated with the database containing the content, which coordinates the propagation of content, and the server prompts the user for information concerning the desired destination for the propagation. When the user is engaging with the propagation player via a web browser, the player can cause a new browser window to open containing a user interface from which the server can extract information used to perform the propagation. The mechanism for obtaining this information can be similar to that used by the server to originally propagate the content to the $3^{rd}$ party site. In a number of embodiments, the act of secondary propagation and the site to which the content was propagated are recorded. In several embodiments, the server that performs the propagation records the propagation in the database containing the propagated content.

Graphically Representing Content Propagation

Systems that record information concerning the propagation of content and interactions with propagated content in accordance with embodiments of the invention can collate the recorded information for inclusion in reports and/or graphical display. In many embodiments, information concerning the $3^{rd}$ party websites to which content has been propagated and interactions with the propagated content are displayed so that each $3^{rd}$ party website is apparent from the display. In many embodiments, the display also associates the number of times that the content has been viewed from each of the identified $3^{rd}$ party websites. In other embodiments, tallies for multiple different types of interactions are associated with each of the identified $3^{rd}$ party websites.

In several embodiments, a particularly efficient manner in which to represent propagations and interactions is as a graph (i.e. a set of vertices connected by edges) where the central vertex represents the website associated with the database containing the content and propagations of the content are represented by edges extending from the central vertex to a satellite vertex. Higher level propagations, such as secondary propagations, can be represented by edges extending from the satellite vertex representing the website from which the secondary propagation occurred to a further satellite vertex representing the location to which the content was propagated via the secondary propagation. As such, each propagation is represented by an edge and each vertex represents a location from which the content can be accessed. A piece of content can be propagated multiple times to a particular $3^{rd}$ party website, such as occurs when a piece of content is propagated to the user profile pages of multiple members of an online social network. Multiple propagations to a single website can be represented as multiple edges, a single edge having increased thickness, and/or a single edge accompanied by a numerical representation of the number of propagations to the $3^{rd}$ party website. Additional information concerning interactions with the content via $3^{rd}$ party websites can be represented by the size of the vertex, the color of the vertex, and/or a numerical representation of the number of interactions.

Figure 2:
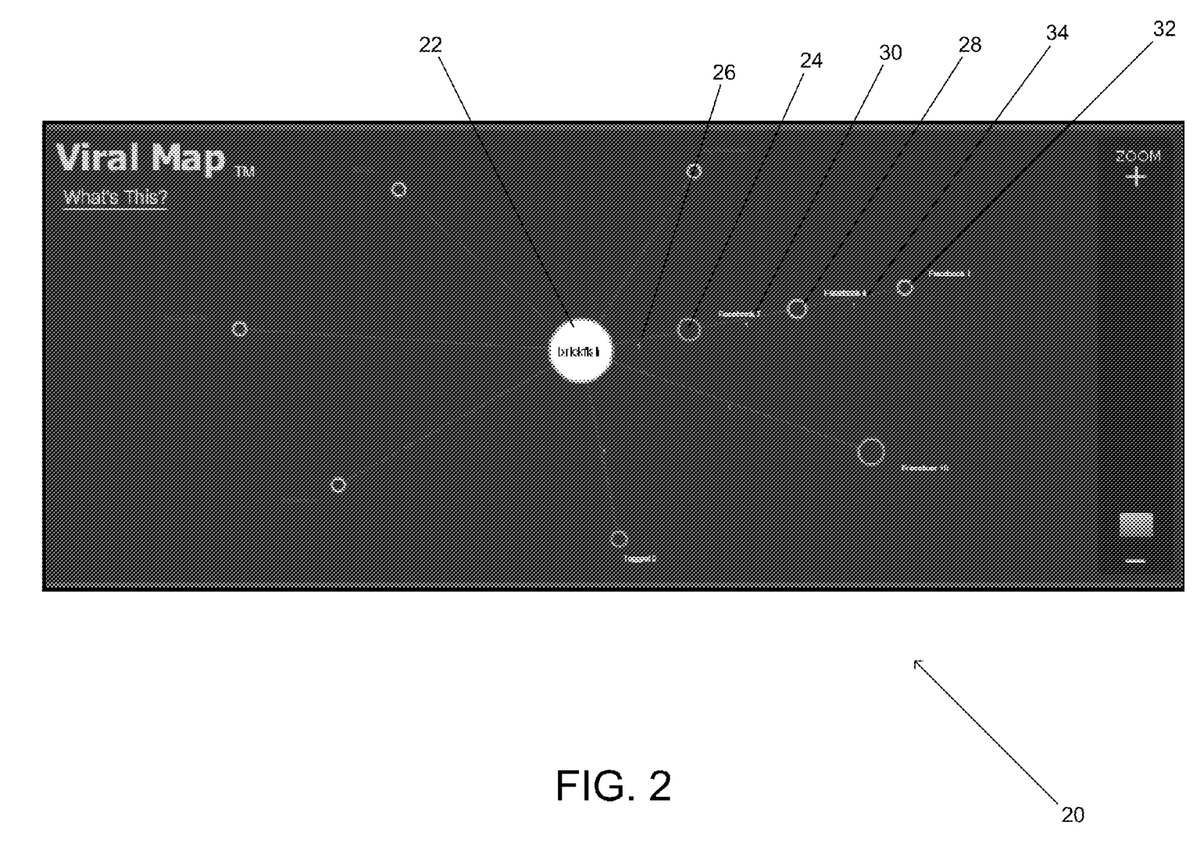
FIG. 2 is a screen shot of a propagation map in accordance with an embodiment of the invention that shows information concerning secondary and higher level propagation.

A screen shot of a user interface generated by an online marketing platform showing the propagation of a piece of content, which is a UGC submission to an online marketing campaign, using a graph in accordance with an embodiment of the invention is shown in FIG. 2. At the center of the propagation map 20 is an indicator such as a central circle 22 showing the original UGC submission. In many embodiments, the size of the circle and/or additional textual information indicates the extent of the user engagement with the UGC submission that occurred via the online marketing platform. The central circle 22 is connected via a line to a first satellite circle 24 or other indicator. The first satellite represents the propagation of the UGC submission to a specific $3^{rd}$ party site. A number located in close proximity to the line connecting the first satellite and the center circle indicates the number of times that the UGC submission has been directly propagated from the online marketing platform to the website. The size of the first satellite and/or additional textual information can indicate the extent of user engagement with the UGC submission that resulted from the propagation to the $3^{rd}$ party site. In the illustrated embodiment, there are a number of additional satellite circles that are directly connected to the center circle and each is a graphical representation of the direct propagation of a UGC submission to a particular location.

A second satellite circle 30 or other indicator is connected to the first satellite circle 24 via a line 30. The second satellite indicates a secondary propagation that emanated from the site represented by the first satellite circle 24. As with the first satellite, information is provided concerning the number of secondary propagations to the site represented by the second satellite and the extent of user engagement with the UGC submission that was derived as a result of the secondary propagation.

The extent of propagation that can be depicted is not limited to secondary propagations. Additional propagation levels emanating from secondary propagations can also be depicted, depending on the desired complexity and sophistication of visual display of propagation. In the illustrated embodiment, a third satellite circle 32 connected to the second satellite circle 28 is shown to provide information concerning propagations from the site indicated by the second satellite to the site indicated by the third satellite.

Although a specific example of the depiction of information concerning propagation using a graph is shown in FIG. 2, information concerning propagation, interactions and/or engagement can be presented graphically in any of a number of ways. In addition, graphical representations of propagation can be interactive and can, for example, allow a user to navigate through different propagation levels and zoom in or zoom out to get varying amounts of detail regarding specific attributes related to the propagation. In several embodiments, satellites or other graphical representations of propagated websites can be selected in order to link to the site to which a piece of content, a UGC submission, or a campaign has been propagated and/or to perform an additional propagation of the content to the selected website. In instances where a piece of content, a piece of content, a UGC submission, or a campaign has been propagated to a site multiple times, a user can navigate to any one of the propagation locations within the site via the propagation map. In a number of embodiments, a user can select a site shown on a propagation map and can propagate the piece of content, UGC submission and/or campaign to their own profile on the selected site. In many embodiments, users can manipulate the propagation map and the user manipulations enable the user to inspect more closely different portions of the propagation map.

Tracking and Displaying Propagation Across Multiple Pieces of Content

Tracked information concerning engagement with content stored in a database can be aggregated across multiple pieces of content to provide an understanding of user engagement with a category of content. For example, interactions could be aggregated over all pieces of content tagged with the term "humor", all interactions that occurred within a predetermined time period, or simply all interactions with all content. Online marketing platforms in accordance with many embodiments of the invention are not only able to generate propagation maps for an individual piece of content, but can generate propagation maps for entire campaigns, or portions of campaigns filtered according to a set of criteria. In many instances, the propagation map for an entire campaign can be generated in a similar manner to the propagation map shown in FIG. 2, with the exception that the statistics used to generate the propagation map are summed across all UGC submissions within a campaign. Accordingly, systems in accordance with embodiments of the invention are not limited to collecting and graphically displaying information concerning propagation of a single piece of content. Many systems are configured to collect and graphically display information concerning multiple pieces of content.

Graphically Representing Geographic Location of Content Interactions

Systems in accordance with embodiments of the invention can track interactions with individual pieces of content. When a request associated with an interaction is received by a server that provides access to a piece of content stored in a database from a user's browser application, the server can record the I.P. address from which the request emanated. Due to the manner in which different Internet service providers assign I.P. addresses, the recorded I.P. address provides information concerning the geographic location of the user interacting with the content. In many embodiments, the server maps recorded I.P. addresses to geographic location, such as ZIP code, or provides the I.P. address to a $3^{rd}$ party system that performs the mapping. Additional processes can also be used to identify geographical location, for example, cookie tracking or automatically retrieving geographic location information from user profiles or user provided data. In a number of embodiments, the user device used to interact with the content includes a GPS receiver and the GPS coordinates of the user are communicated to the server associated with the database as part of the interaction.

Once geographic location is determined, systems in accordance with embodiments of the invention can display the geographic locations in which interactions with a single piece of content occurred or interactions aggregated across multiple pieces of content occurred. Data can be mapped as a single aggregated pinpoint or differentiated through different identifiers, such as different shapes, colors, and so forth. Campaigns can include thousands of data points but graphical views can be rolled up or focused down to city or regional levels. Views can also be limited to regional views or pinpoints masked or removed to protect user privacy.

Figure 2B:
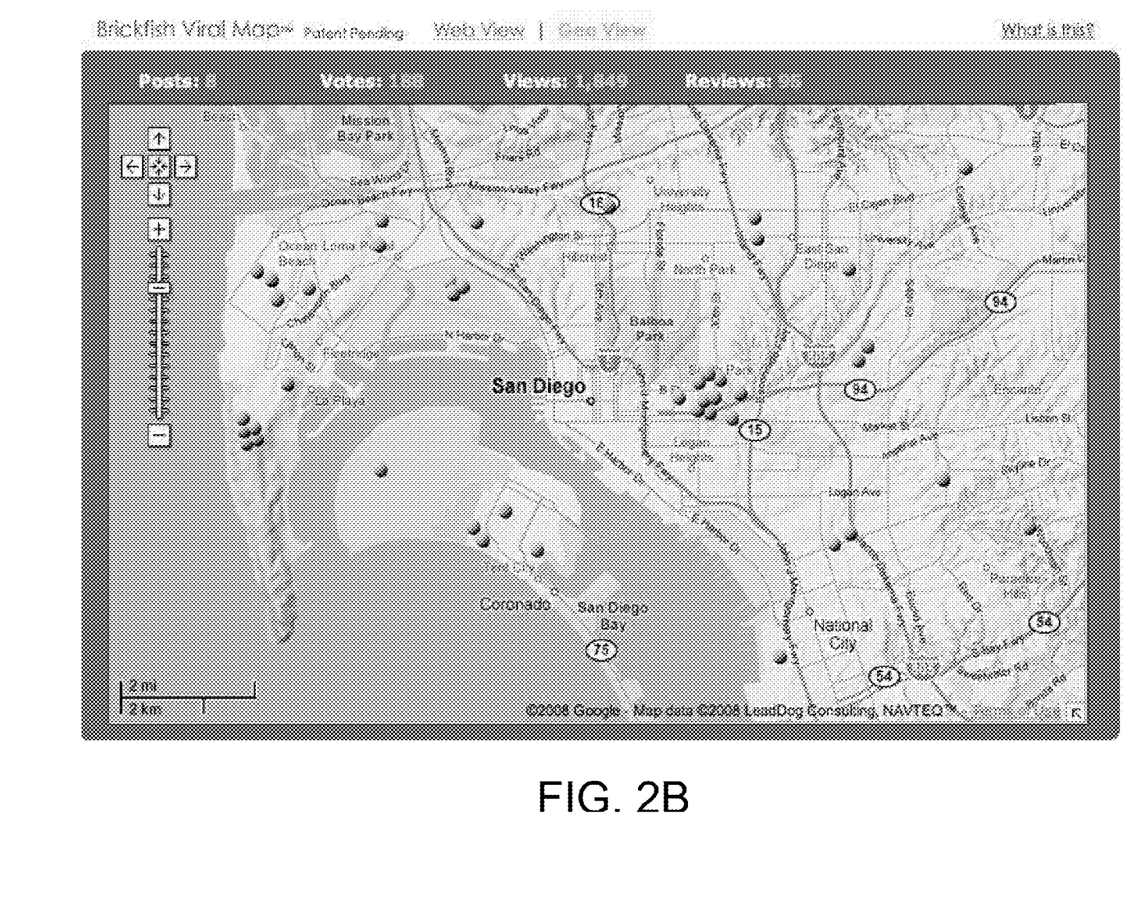
FIG. 2B is a screen shot of a map showing the geographic locations in which user interactions with a piece of content occurred.

In a number of embodiments, information concerning interactions and geographic location is retrieved from a database and formatted as inputs to an API of a $3^{rd}$ party service that generates a map indicating the geographic locations of each of the interactions. In one embodiment, the information is provided to the Google Maps API provided by Google Inc. of Mountain View, Calif. and a map generated using the Google Maps API is inserted into a webpage hosted by the server providing the information or by another associated server. A map generated by aggregating information in the manner outlined above and providing formatted information to the Google Maps API in accordance with an embodiment of the invention is shown in FIG. 2B. In many embodiments, other mapping applications are used to generate a graphical display of the data.

Online Marketing Platforms

As discussed above, systems and methods for tracking interactions with content are particularly useful in the context of online marketing platforms that promote viral distribution of UGC submitted in response to a particular theme or idea. In many embodiments, engagement of users with a campaign is tracked and can be used to track the campaigns with which specific users engage and to determine patterns in the campaigns that tend to attract the same users. In several embodiments, users can also specify aspects of a UGC submission, campaign, category and/or user that are of interest to them and for which they would like to receive updates from the online marketing platform. The updates can be customized and are often presented as information within a user's profile and/or homepage. In many instances, the updates are provided as messages that can be directed to a user via e-mail, SMS and/or other messaging technologies. In a number of embodiments, the online marketing platform grants awards to campaign winners that can be included on the winner's profile both within the online marketing platform and on other sites.

Tracking Engagement Across Campaign Categories

Online marketing platforms in accordance with several embodiments of the invention are also able to generate propagation maps for multiple campaigns. In many embodiments, the campaigns that are used to generate the propagation map can be selected based on any number of criteria. For example, campaigns sponsored by the same sponsor could be used as the basis of a propagation map, as could campaigns presented by the same advertising agency. In many embodiments, campaigns are categorized according to different subject matter (e.g. Sport, Politics, Fashion, Lifestyles, Music or Art) and a propagation map can be created for every campaign within a particular category.

Tracking Engagement from One Campaign to Another

As discussed above, online marketing platforms in accordance with many embodiments of the invention track engagement of users with campaigns and UGC submissions. In a number of embodiments, the information collected concerning specific users is used to identify patterns in the campaigns with which individual users engage. Information concerning patterns of individual users can also be used by online marketing platforms to identify particularly influential users and to identify the characteristics of users that are likely to be interested in a new campaign given interest in a previous campaign. Information concerning user preferences can be used to tailor the type of campaign (e.g., category or type of UGC submission solicited) that is likely to resonate with a demographic that is the target of the campaign. In many embodiments, the online marketing platform provides a search utility that enables searches to be conducted within a database of tracked user engagement. In several embodiments, the search utility can include several preconfigured searches that enable the tracking of user engagement from one campaign to another.

Watch Lists

A user engaging with a campaign hosted by an online marketing platform in accordance with an embodiment of the invention may have an interest in tracking the progress of particular UGC submissions. In many embodiments, the user can select specific UGC submissions and add the submissions to a watch list. The watch list is used by the online marketing platform to provide the user with information concerning the progress of the submissions during the campaign. In several embodiments, the watch list may simply be a list that a user can view in his or her profile showing a thumbnail of the UGC submission and the current ranking of the UGC submission. In several instances, the list is interactive so that the user can navigate to each UGC submission via the list. In a number of embodiments, the online marketing platform uses the watch list to send communications to the user concerning each UGC submission on the watch list. In several embodiments, the online marketing platform provides the user with the option to specify the types of notifications to receive (e.g. daily updates on the ranking of the entry). In other embodiments, the online marketing platform automatically sends predetermined updates to the user.

Figure 3:
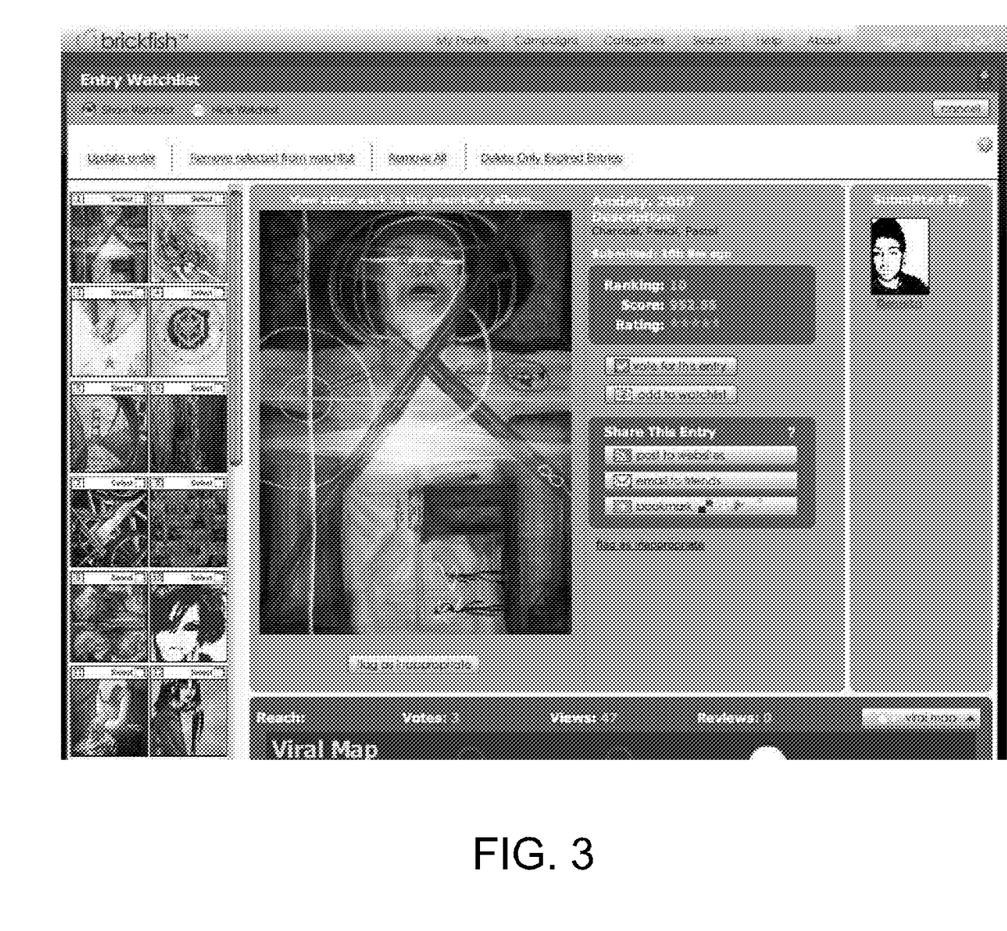
FIG. 3 is a screen shot of a watch list in accordance with an embodiment of the invention.

A screen shot of a user interface displaying a watch list in accordance with an embodiment of the invention is shown in FIG. 3. The displayed watch list includes a list of submissions. The user has the option of arranging the order in which submissions are displayed. In many embodiments, the watch list is included on a user profile so that other users can view the submissions that are of interest to the user that posted the profile. In addition to arranging the entries, a user can purge entries from expired campaigns and perform other management functions.

Although a watch list is discussed above in the context of UGC submissions, online marketing platforms in accordance with embodiments of the invention can support any number of different types of watch lists. For example, a user could add a particular campaign category or campaign sponsor to a watch list to indicate to the online marketing platform that the user wishes to receive a notification whenever a new campaign is launched in the category or by the campaign sponsor. In other embodiments, users can notify the online marketing platform of any aspect of a UGC submission, campaign, campaign category, and/or user in relation to which the users would like to receive updates.

Awards

Campaigns conducted on online marketing platforms in accordance with many embodiments of the invention include the selection of winners in a number of different categories. In several embodiments, the online marketing platform provides an option for winners to include an acknowledgement of the fact that they were a winner of a particular campaign on their profile. In a number of embodiments, the acknowledgement can be propagated to a user's profile on a $3^{rd}$ party site such as an online social networking site. In many embodiments, the online marketing platform obtains information from the winner concerning the winner's profile or login information on various $3^{rd}$ party websites and uses the information to embed an award into the user's profile or within the $3^{rd}$ party website. In several embodiments, the winner is only able to propagate the acknowledgement once to each online social networking site. In many embodiments, winners of campaigns are not the only people that can receive rewards. For example, awards could be granted for participation or in accordance with any other set of criteria.

While the above description contains many specific embodiments of the invention, these should not be construed as limitations on the scope of the invention, but rather as an example of one embodiment thereof. For example, much of the discussion above references propagation to websites. In a number of embodiments, pieces of content can be propagated to other sites such as WAP sites and interactions via $3^{rd}$ party sites are tracked. Furthermore, the above discussion references a simple architecture of a database and associated server. In many embodiments, multiple related servers provide access to content contained within a database, and in several embodiments, the database is distributed and/or replicated to provide better access to the content within the database. Accordingly, the scope of the invention should be determined not by the embodiments illustrated, but by the appended claims and their equivalents.

What is claimed is:

1. A method of generating a graphical display showing interactions with a piece of content accessible via a number of unrelated websites, comprising:

storing a piece of content within a database and providing access to the piece of content via a website hosted by a server associated with the database, where the database is used to create an online marketing platform for an online social network and the piece of content is user-generated content solicited via the online marketing platform;

receiving a request from a user to propagate the piece of content to a first $3^{rd}$ party website hosted via a first $3^{rd}$ party server;

obtaining user account information;
accessing the first 3$^{rd}$ party server using the user account information;
providing propagation player code to the first 3$^{rd}$ party server, where the propagation player code includes information enabling a browser application to access the piece of content via the server associated with the database and where the propagation player code can be reused on a second 3$^{rd}$ party website hosted on a second 3$^{rd}$ party server;
receiving requests from browser applications, where the requests are associated with user interactions with the piece of content;
identifying requests associated with a user interaction via the propagation player included in the first 3$^{rd}$ party website;
identifying the first 3$^{rd}$ party website via the requests associated with the user interaction via the propagation player;
updating database records tracking user interactions with the piece of content via different websites in response to the received requests;
generating a display of the websites to which the content has been propagated, where the display includes at least one 3$^{rd}$ party website and information concerning engagements with the content, where the display is a graph, the vertices of the graph represent websites and the edges of the graph represent propagation of the piece of content, and at least one vertex is annotated with at least one annotation indicative of the number of a particular type of interaction that occurred with a piece of content via the website corresponding to the vertex.

2. The method of claim 1, wherein the website hosted by the server associated with the database includes a user interface, which enables a user to request that the piece of content be propagated to the second 3$^{rd}$ party website hosted via the second 3$^{rd}$ party server.

3. The method of claim 1, wherein the server associated with the database uses identifying information included in requests received from propagation players to identify at least one 3$^{rd}$ party website through which a user is interacting with the piece of content.

4. The method of claim 3, wherein:
the propagation player code includes a unique URL for each piece of content;
the propagation player requests information from the server, where the request includes the URL and information identifying the URL of the website containing the propagation player; and
the server associated with the database uses the URL of the website to update database records tracking user interactions with the piece of content via different websites in response to the received requests.

5. The method of claim 1, wherein the propagation player includes a user interface, which enables a user to request that the piece of content be propagated to the second 3$^{rd}$ party website hosted via the second 3$^{rd}$ party server.

6. The method of claim 1, wherein the display is a graph, where the vertices of the graph represent websites and the edges of the graph represent propagation of the piece of content.

7. The method of claim 6, wherein each vertex is represented by a circle and the radius of the circle is proportional to the number of interactions with the piece of content via the website represented by the vertex.

8. The method of claim 6, wherein multiple propagations originating from a first website to a second website are represented by a single line annotated with a number indicating the number of propagations.

9. The method of claim 6, wherein the vertex corresponding to the website hosted by the server associated with the database is located at the center of the graph and edges corresponding to propagations from the website radiate outward.

10. The method of claim 6 wherein each vertex is annotated with at least one annotation indicative of the number of a particular type of interaction that occurred with a piece of content via the website corresponding to the vertex.

11. The method of claim 10, wherein the particular type of interaction is viewing, scrolling over, accessing, voting, reviewing, or playing the content.

12. The method of claim 10, wherein the at least one annotation is indicative of a score that is calculated using a function of the number of multiple different types of interaction.

13. A method of generating a graphical display of interactions with a piece of content, comprising:
storing a piece of content within a database and providing access to the piece of content via a website hosted by a server associated with the database, where the database is used to create an online marketing platform for an online social network and the piece of content is user-generated content solicited via the online marketing platform;
receiving requests from browser applications, where the requests are associated with user interactions with the piece of content;
identifying the geographic location from which the requests originated;
updating database records tracking user interactions with the piece of content based upon geographic location in response to the received requests;
receiving requests to propagate the piece of content to a first 3$^{rd}$ party website hosted via a first 3$^{rd}$ party server;
providing propagation player code to the first 3$^{rd}$ party server, where the propagation player code includes information enabling a browser application to access the piece of content via the server associated with the database and the propagation player code can be reused on a second 3$^{rd}$ party website hosted on a second 3$^{rd}$ party server;
identifying requests associated with a user interaction via the propagation player;
updating database records tracking user interactions with the piece of content in response to the identified requests; and
generating a map showing the geographic locations in which interactions with the content have occurred and information concerning engagement with the content, where the display is a graph, the vertices of the graph represent websites and the edges of the graph represent propagation of the piece of content, and at least one vertex is annotated with at least one annotation indicative of the number of a particular type of interaction that occurred with a piece of content via the website corresponding to the vertex.

14. The method of claim 13, further comprising:
obtaining user account information; and
accessing the 3$^{rd}$ party server using the user account information.

15. The method of claim 14, wherein the map indicates the website via which the user interactions occurred.

16. The method of claim 13, wherein interactions are indicated on the map as a single aggregated pinpoint.

17. The method of claim 13, wherein different types of interactions are indicated on the map using different identifiers.

18. The method of claim 13, wherein identifying the geographic location from which the requests originated comprises mapping an I.P. address associated with the request to a geographic location.

19. The method of claim 14, wherein identifying the geographic location from which the requests originated further comprises:
   maintaining user accounts including address information;
   receiving log in information from users accessing the content; and
   identifying a request from a user logged into a user account and assigning the address information in the user account as the geographic location from which the request originated.

20. A method of generating a graphical display showing interactions with content accessible via a number of unrelated websites, comprising:
   storing multiple pieces of content within a database and providing access to the pieces of content via a website hosted by a server associated with the database, where the database is used to create an online marketing platform for an online social network and the piece of content is user-generated content solicited via the online marketing platform;
   receiving requests from users to propagate the content to $3^{rd}$ party websites hosted via $3^{rd}$ party servers;
   obtaining user account information;
   accessing the $3^{rd}$ party servers using user account information;
   providing propagation player code to the $3^{rd}$ party servers, where the propagation player code includes information enabling a browser application to access a piece of content via the server associated with the database and where the propagation player code can be reused on other $3^{rd}$ party servers;
   receiving requests from browser applications, where the requests are associated with user interactions with one of the pieces of content;
   identifying requests associated with a user interaction via a propagation player included in a $3^{rd}$ party website;
   identifying the $3^{rd}$ party website via the requests associated with the user interaction via the propagation player;
   updating database records tracking user interactions with each of the pieces of content via different websites in response to the received requests; and
   generating a display of the websites to which pieces of content have been propagated occurred and information concerning engagement with the content, where the display is a graph, the vertices of the graph represent websites and the edges of the graph represent propagation of the piece of content, and at least one vertex is annotated with at least one annotation indicative of the number of a particular type of interaction that occurred with a piece of content via the website corresponding to the vertex.

21. The method of claim 20, wherein generating a display of the websites to which pieces of content have been propagated comprises:
   selecting pieces of content according to a filtering criteria;
   identifying websites to which the selected pieces of content have been propagated; and
   generating a display of the websites to which the selected pieces of content have been propagated.

* * * * *